United States Patent [19]

Basseen et al.

[11] Patent Number: 4,638,852
[45] Date of Patent: Jan. 27, 1987

[54] AIR DRYER FOR PNEUMATIC SYSTEMS

[76] Inventors: Sanjiv K. Basseen, 131 Bay Path Dr., Oak Ridge, Tenn. 37830; Richard A. Harlan, Rte. 2, Box 1081, Wartburg, Tenn. 37887

[21] Appl. No.: 766,835

[22] Filed: Aug. 16, 1985

[51] Int. Cl.[4] .................. F25D 17/06; F28D 7/10; F25J 3/08; F28B 9/10
[52] U.S. Cl. .................... 165/47; 165/141; 165/113; 62/93; 62/95
[58] Field of Search ............... 62/93, 95; 165/141, 165/155, 145, 113, 47

[56]     References Cited
     U.S. PATENT DOCUMENTS

| | | | |
|---|---|---|---|
| 826,773 | 7/1906 | Engleitner | 165/141 |
| 938,779 | 11/1909 | Morrison | 165/155 |
| 2,643,863 | 6/1953 | Buschow | 165/141 |
| 2,682,157 | 6/1954 | Boling et al. | 165/141 |
| 3,583,415 | 6/1971 | Smith | 165/141 |
| 3,722,583 | 3/1973 | Fiedler | 165/176 |
| 3,734,174 | 5/1973 | Bloxham et al. | 165/177 |
| 4,193,443 | 3/1980 | Nanaumi et al. | 62/93 |
| 4,235,081 | 11/1980 | Dowling | 62/93 |
| 4,242,877 | 1/1981 | Geerkens | 62/93 |
| 4,253,315 | 3/1981 | Fiedler | 62/93 |

FOREIGN PATENT DOCUMENTS

| | | | |
|---|---|---|---|
| 470955 | 10/1914 | France | 165/141 |
| 270250 | 3/1928 | United Kingdom | 165/141 |

Primary Examiner—William R. Cline
Assistant Examiner—John K. Ford
Attorney, Agent, or Firm—Pitts and Brittian

[57] ABSTRACT

A heat exchanger for dehumidification of compressed air. The improved heat exchanger employs an air-to-air heat exchanger portion and a air-to-refrigerant heat exchanger portion that are arranged substantially parallel and coextensive. Each of these heat exchanger portions are made up of a plurality of tube units, each tube unit having three concentric tubes. The tubes terminate at each end in separate header units. Incoming air is passed co-currently in the air-to-air heat exchanger portion with air that has been dehumidified, whereupon a precooling stage is achieved. This precooled air is then passed countercurrently to refrigerant in the air-to-refrigerant portion of the heat exchanger for causing condensation of moisture therein. This cool air is passed through a moisture separator, with the dehumidified air being recycled through the air-to-air heat exchanger portion prior to use, as set forth above. The components are fabricated from standard tubing elements. The use of the triple concentric tubing to produce two heat exchange surfaces per tube unit substantially reduces the required tubing length. This reduction and increased heat transfer results in a savings of materials of at least 50 percent over that employing duplex heat exchange tubing and other heat exchanger configurations of the prior art.

7 Claims, 6 Drawing Figures

AIR DRYER FOR PNEUMATIC SYSTEMS

TECHNICAL FIELD

The present invention relates generally to heat exchangers, and more particularly to a compact and efficient heat exchanger to remove moisture from the air in pneumatic systems.

BACKGROUND ART

When air is compressed for use in pneumatic systems and the like, the temperature of the air is raised significantly in the compressor. For example, the outlet air temperature from the compressor may be as high as 350° F. Air at this temperature tends to contain a significant amount of moisture. It is conventional practice to provide some form of moisture removal equipment in the exit stream to remove the excess moisture prior to the use of the compressed air. This is particularly essential when the compressed air is used for machine tool air motors, for painting or for other similar applications where moisture would be detrimental.

Several forms of air dryers are known in the art. Probably the most commonly used equipment for the drying involves some piece of equipment which cools the air and then causes the moisture to condense on a surface such that it can be removed to provide air for the pneumatic systems having substantially reduced moisture content. One such device is described in U.S. Pat. No. 3,359,753, issued to M. Fiedler, et al., on Dec. 26, 1967. In this device the air is caused to pass through a porous material that is maintained at a reduced temperature by the use of a refrigerant passing through coils in this porous material. The condensed moisture is collected and removed through a suitable drain.

Another type of heat exchanger for cooling the outlet air from air compressors is shown and described in U.S. Pat. No. 4,193,443, issued to K. Nanaumi, et al., on Mar. 18, 1980. In this device the moist air first flows past tubes containing air that has been dryed in the device where upon the temperature of the incoming air is moderated. This air then flows through a second portion of the heat exchanger past a plurality of baffles that are connected to tubes carrying a refrigerant. The baffles being at a reduced temperature cause the moisture to condense thereon, and to be deposited in a lower portion of the heat exchanger where they are withdrawn through a suitable drain.

Still another type of heat exchanger for air drying in the compressed air art is that shown in U.S. Pat. No. 4,235,081, issued to R. O. Dowling, on Nov. 25, 1980. This device performs similarly to the heat exchanger of the '443 patent, except that it is physically divided into an air-to-air heat exchanger, and an air-to-refrigerant heat exchanger. The division into these two components reduces some of the cost and complexity of fabrication. Both the device of this patent and that of the '443 patent utilize a plurality of tubes about which the air flow passes to accomplish the heat exchange.

In still other forms of heat exchangers for the cooling of air, it is quite conventional to have duplex tubing wherein air flows through one annulus of the duplex tubing, and refrigerant or predryed air flows in the other annulus. While the duplex form of tubing provides a cooling surface, heat exchangers for a large sized compressor are extensive in size, and thus are difficult to fabricate and to ship, and accordingly are expensive. It is often necessary to utilize tubing bent into a U-shape in order to achieve a given capacity within a specific size limitation.

Accordingly, it is a principal object of the present invention to provide a heat exchanger wherein sufficient cooling surface is provided to dehumidify the air for pneumatic systems, whereby the heat exchanger has a reduced volume for a specific capacity, such that the cost of producing the heat exchanger is substantially reduced.

It is another object of the present invention to use a triple tube array with multiple units in parallel, whereby there is heat exchange accomplished at two surfaces to increase the efficiency of a given size of a heat exchanger.

It is an additional object of the present invention to provide a design for a heat exchanger to be used in the removal of moisture from compressed air systems, which heat exchanger is fabricated using techniques which minimize the cost of the fabrication.

These and other objects of the present invention will become apparent upon a consideration of the drawings referred to hereinafter and the complete description of the invention with regard to those figures.

SUMMARY OF THE INVENTION

In accordance with the present invention, a heat exchanger is constructed for removing moisture from air utilizing an assembly of tube units each having three concentric tubes wherein the individual tubes terminate in parallel header elements such that distinct flow can be maintained in each of the tubes and the heat transfer surface is substantially increased. The heat exchanger is divided into two sections, the first being an air-to-air heat exchanger for precooling the incoming air by the air that has had the moisture removed, and thence a second section which is an air-to-refrigerant heat exchanger wherein the principal cooling of the air is achieved for moisture removal. Through the use of the three concentric tubes and the array of the headers, the present invention is readily fabricated, and the resultant heat exchanger for a given capacity is substantially reduced in size over that required using devices of the prior art.

BRIEF DESCRIPTION OF THE DRAWINGS

FIG. 3 is a side view taken from the right side of the assembly of FIG. 1.

DETAILED DESCRIPTION OF THE INVENTION

Figure 1:
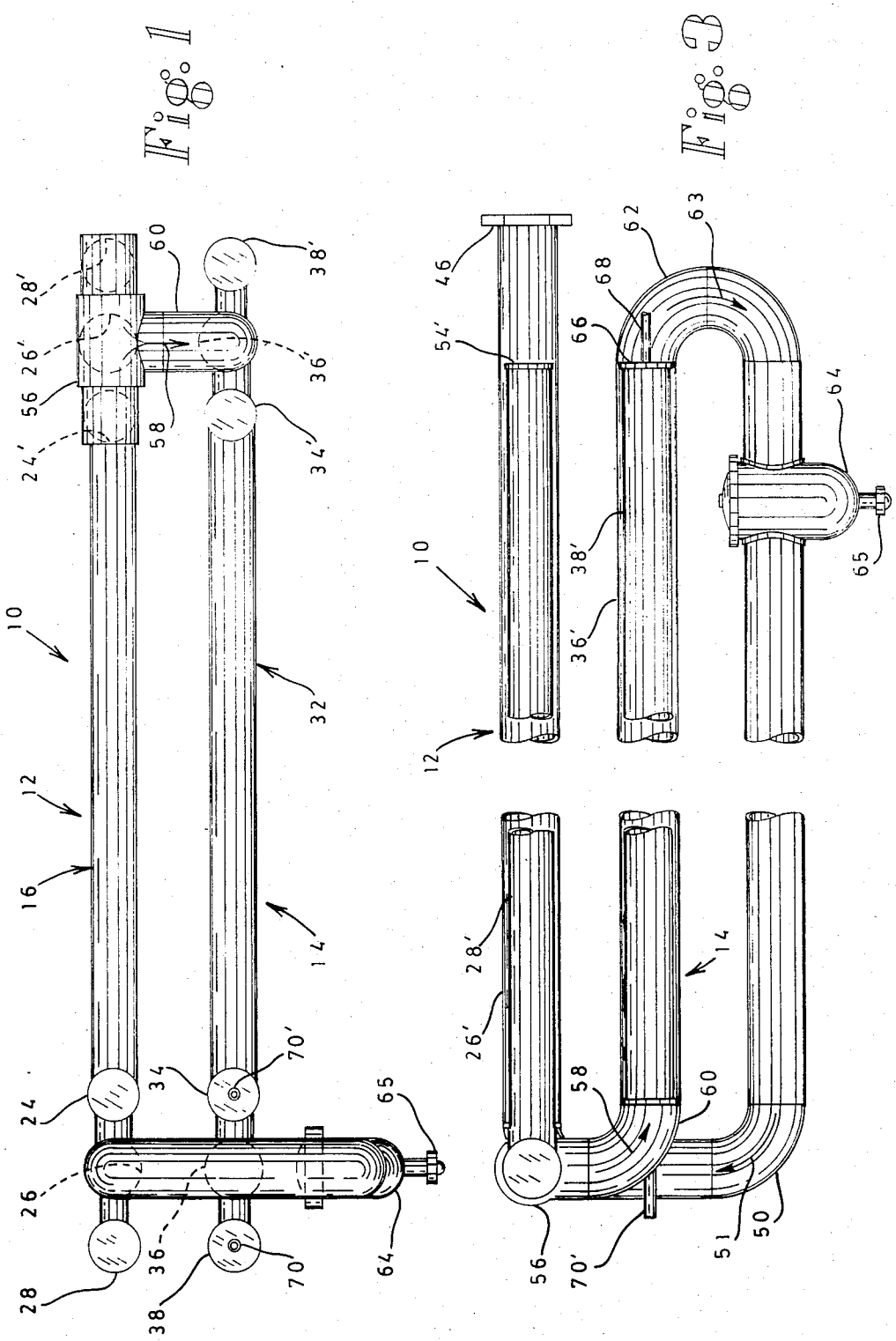
FIG. 1 is as front view of an assembly of the heat exchanger of the present invention.
Figure 2:
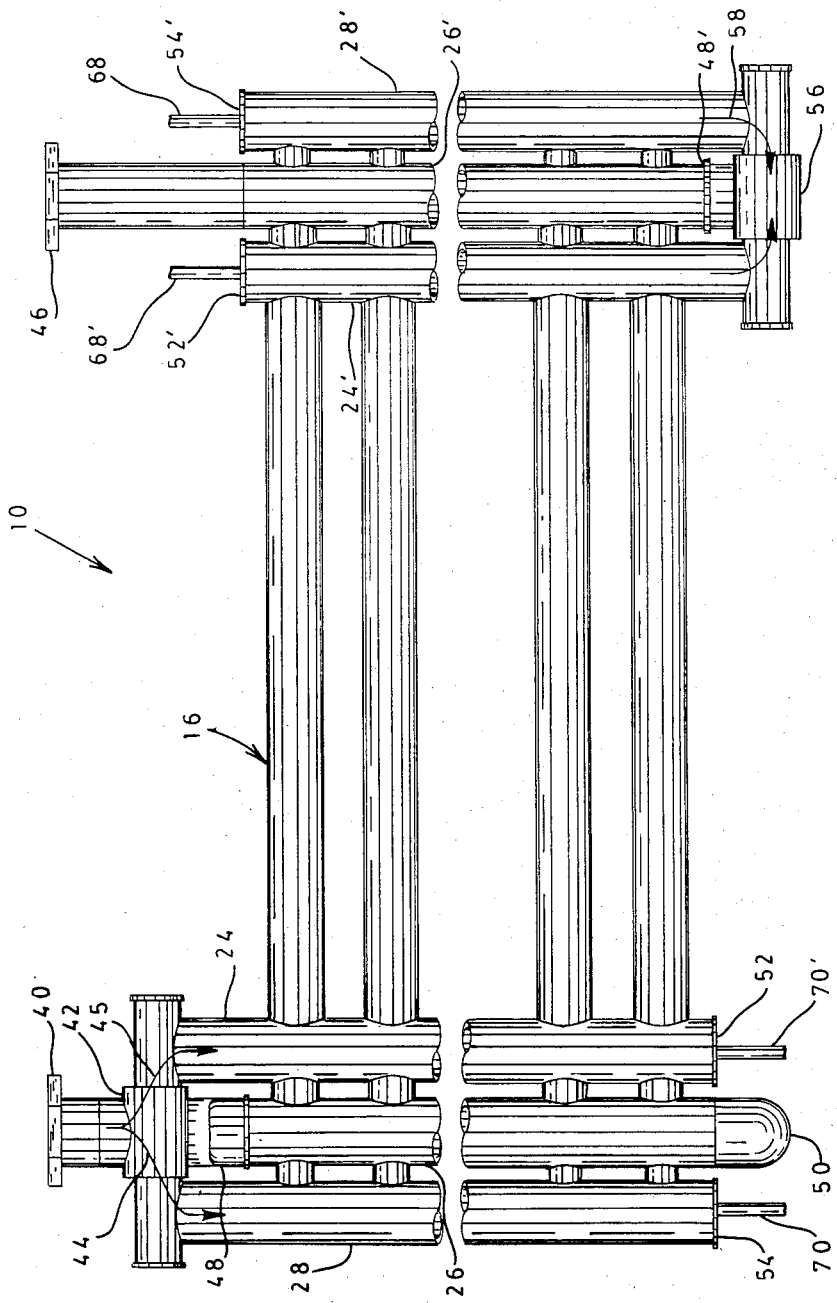
FIG. 2 is a top view of the assembly of FIG. 1.

Referring now to FIGS. 1 through 3, shown at 10 in these figures are three exterior views of the invention of the present invention. FIG. 1 is a frontal view of the subject heat exchanger; FIG. 2 is a top of the heat exchanger; and FIG. 3 is a side elevational view of that heat exchanger.

Referring first to FIG. 1, shown therein is an arrangement of an air-to-air heat exchanger section 12, positioned above and generally parallel to an air-to-refrigerant heat exchanger portion 14. The air-to-air heat exchanger 12 is made up of a plurality of substantially parallel tube units 16. Each of these tube units 16 consists of three concentric tubes as illustrated in the cross-section shown in FIG. 5. There is an outer tube 18, an inner tube 20, and an intermediate tube 22. These tubes thus define an outer annulus 19, an inner channel 21, and an intermediate annulus 23. Each of these tube units 16 terminate in appropriate headers 24, 26, 28, respectively, and a more detailed termination thereof is illustrated in the cross-section of FIG. 4. The opposite end of the tube units 16 terminate in corresponding headers 24', 26', 28'.

The refrigerant-to-air portion 14 of the present invention has a very similar construction to that of section 12. It is made up of a plurality of substantially parallel tube units 32 which have a cross-section similar to that shown in FIG. 5 wherein there are three concentric tubes. These tube units 32 terminate at one end in headers 34, 36, 38, and at the opposite end in headers 34', 36', and 38'. For simplicity of construction, the tube units 32 are identical with tube units 16.

Referring now specifically to FIG. 2, an inlet to the air-to-air heat exchanger is provided through a flange 40, and a diverter 42 directs incoming heated air into headers 24 and 28, following the paths indicated by the arrows 44, 45. At the opposite end of the air-to-air heat exchanger portion, the header 26' terminates in a flange 46 which is placed substantially symmetrical with the aforementioned inlet flange 40. This flange 46 provides means for directing dehumidified air into a pneumatic system. Header 26 is capped as at 48 on one end, and at the opposite end is provided with an elbow 50 for bringing dehumidified air from the air-to-refrigerant section 14 into the air-to-air heat exchanger section 12. It will be seen that headers 24 and 28 are provided with end caps 52, 54, respectively.

At the opposite end of the air-to-air heat exchanger portion 12, the headers 24', 28' are provided with end caps 52', 54', and header 26' is provided with an end cap 48'. The open ends of the headers 24' and 28' terminate in a collector unit 56 whereupon flow within these headers is merged as indicated by the arrow 58.

Referring now to a combination of FIGS. 1 and 3, it can be seen that the collector unit 56 is connected through piping 60 to the refrigerant-to-air heat exchanger portion 14. This piping 60 directs precooled air into header 36'. The opposite end of header 36' is connected by tubing 62, with air flow indicated by arrow 63, to a separator 64 for the removal of moisture from the cooled air. The output of the separator 64 is directed back through the aforementioned tube 50 in a direction indicated by arrow 51 to the air-to-air heat exchanger portion 12. The separator 64 typically employs centrifugal force, as produced by a rapid change in direction, to remove condensed moisture that is entrapped in the incoming cooled air. It can be seen in FIG. 3 that one end of the header 38' is provided with an end cap 66; a similar end cap is provided on header 34'. These caps 66 are provided with a refrigerant entrance tube 68 (and 68'—see FIG. 2). There is a corresponding refrigerant outlet tube 70' (also 70 as shown in FIG. 2) that connect to headers 34, 38 as shown also in FIG. 1.

Figure 4:
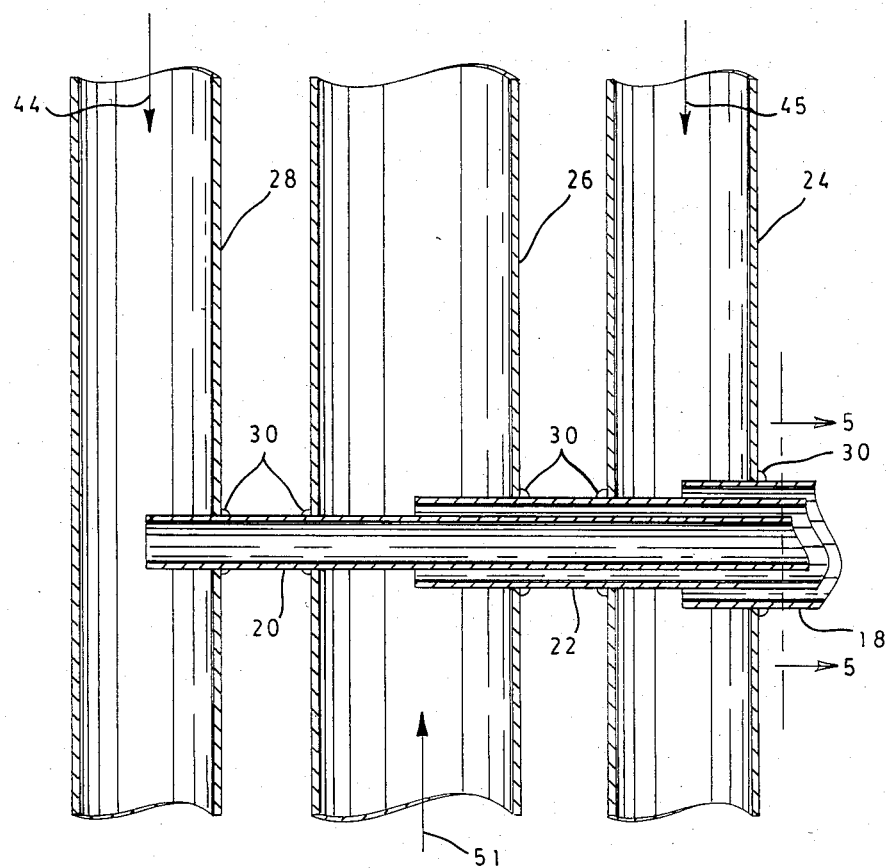
FIG. 4 is a cross-sectional drawing showing a typical construction of a juncture of the triplex tubing of the present invention with appropriate headers.
Figure 5:
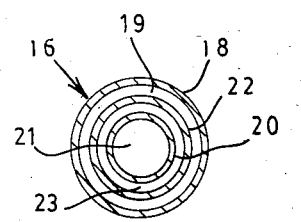
FIG. 5 is a cross-sectional view taken at 5—5 of FIG. 4 showing the concentric arrangement of the triplex tubing.

As stated above, the concentric tubes 18, 20, and 22 of the tube units 16 terminate respectively in headers 24, 28, and 26. This construction is illustrated in the cross-sectional drawing of FIG. 4. It may be seen that the central tube 20 penetrates all of the headers and terminates in an open end midway through header 28. It is sealed to the wall of headers 26 and 28 as with an annular braze or weld 30. Tube 22 penetrates header 24 and one wall of header 26 and terminates at substantially a mid-point of header 26. This tube is sealed to headers 24 and 26 as with the same type of braze or weld 30. Tube 18, being the outer tube of tube unit 16, penetrates substantially one-half of header 24 and is sealed to header 24 with a corresponding braze or weld 30. With this construction, the flow of heated air from a compressor, flowing in the directions indicated by arrows 44, 45, is caused to enter both the central tube 20 and the outer tube 18. Furthermore, dehumidified air flowing from the separator 64 in a direction indicated with the arrow 51 is caused to flow in the middle tube 22, whereby the dehumidified and cooled air provides a precooling of incoming air for the subsequent entrance into the air-to-refrigerant heat exchanger portion 14. While FIG. 4 is explained with respect to the inlet tube/header fabrication for the air-to-air heat exchanger, this same construction is utilized at the outlet end of the air-to-air heat exchanger as well as both ends of tubes used in the air-to-refrigerant heat exchanger portion.

Figure 6:
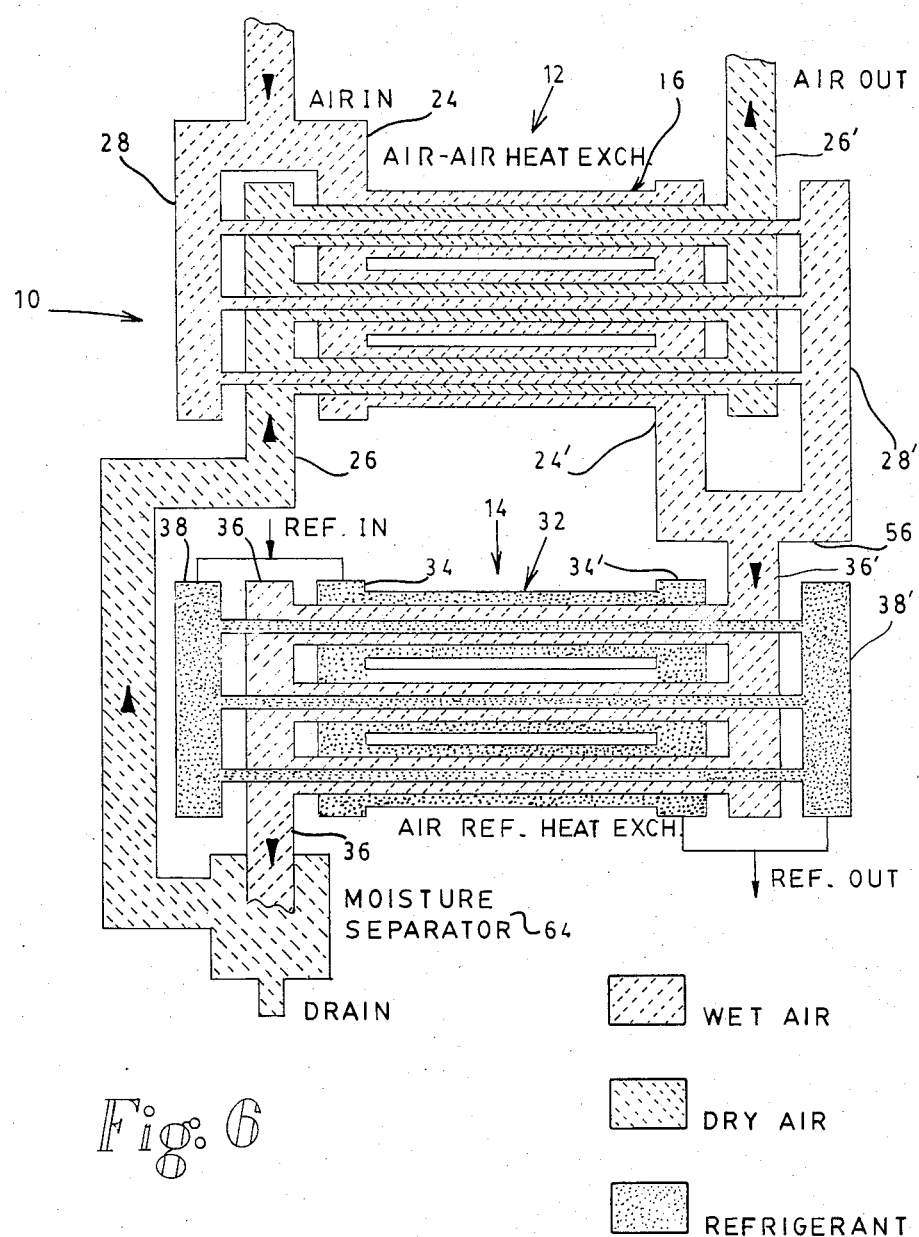
FIG. 6 is a schematic flow diagram of the heat exchanger of the present invention indicating the flow of "wet" air, dry air, and refrigerant through the heat exchanger.

A schematic flow diagram of the subject heat exchanger is shown in FIG. 6. The incoming warm, moist air is divided so as to flow through headers 24, 28 as set forth above. This air then flows through both the outer annuli and the inner channels of the tube units 16 of the air-to-air portion 12. This brings about a cooling of the air which air is collected in headers 24', 26', and conveyed into collector 56" for distribution in the intermediate annulus of tube units 32. The air is collected in header 36 where it then flows through a moisture separator 64, thus producing dehumidified (and cooled) air. This dehumidified air then flows to header 26 for distribution through the intermediate annuli of tubes 16 to header 26' for use in a pneumatic system. By providing two heat transfer surfaces within each tube unit 16 and 32, through the use of triplex tubing, a significantly increased area is created to thereby increase the efficiency of a heat exchanger of a selected size.

Although the sizes of the components of the present invention are not limiting to the invention, the following is a description of a typical embodiment of the invention for the removal of moisture from air in compressed air systems prior to the use of this air in pneumatic tools or other applications. The particular unit was designed for the handling of up to 2,000 standard cubic feet of air per minute, having an incoming air temperature of up to 350° F. The unit was fabricated from tubular copper elements which will withstand up to 250 psi. The refrigerant for this particular embodiment was Freon R-22. For the individual tube units, the outer tube 18 was fabricated from $2\frac{1}{8}$ inch o.d. copper tubing, having a length of 80 inches. The middle tube was fabricated from $1\frac{5}{8}$ inch o.d. copper tubing having a length of approximately 89 inches, and the inner tube was fabricated from $\frac{7}{8}$ inch o.d. copper tubing having a length of approximately 98 inches. These sizes were uniform throughout both the air-to-air heat exchanger portion 12, and the air-to-refrigerant heat exchanger portion 14. The headers for receipt of the ends of the tubes were typically, for headers 24, 28, copper tubing having a diameter of 3⅛ inch, with the central header 26 having a diameter of 4⅛ inch o.d. This particular unit was constructed using thirteen tube units 16 in the air-to-air heat exchanger portion 12, and thirteen tubes 32 in the air-to-refrigerant heat exchanger portion 14. The headers in both portions in 12 and 14 had identical size. The output air from the present invention exited at a temperature in the range of 35° to 40° F., with a sufficiently reduced moisture content that such output air could be utilized in all types of pneumatic systems. Testing of this particular unit demonstrated a reduction of between 20 and 25 percent in tube length over that required for duplex tubing, and a savings in materials of between 50 and 75 percent was achieved.

Although not shown in any of the figures, the tubing units and the headers of the present invention can be encased in thermal insulation to minimize heat losses to the atmosphere. This may be required in some applications, and may not be required in others. Furthermore, if a heat exchanger unit is to operated at pressures exceeding the 250 psi as stated above, the tube units and the headers can be fabricated from the materials having greater strength, e.g., stainless steel. Similar savings in materials and an increase in efficiency would be achieved.

From the foregoing, it can be seen that a heat exchanger has been provided which is a suitable unit for the removal of moisture from compressed air prior to the use of that air in various types of pneumatic systems. Since all of the components are fabricated from standardized materials that are readily available, a substantial savings in cost can be achieved. There is no required bending of tubing as necessitated by other forms of heat exchanger units that have been employed for the same purpose, and significant economic advantages accrue because of this construction.

Although only one specific embodiment of the present invention has been shown and described, there is no attempt to limit this invention by this singular embodiment. Rather, the invention is to be defined by the appended claims and their equivalents when taken in combination with the description.

What is claimed is:

1. A heat exchanger system for removing moisture from compressed air that is to be used in a pneumatic system, which comprises:

a first heat exchanger portion substantially arranged in a first plane, said first heat exchanger portion having
  (a) a first plurality of substantially parallel straight tube units, each tube unit formed of three concentric tubes defining an inner channel, an intermediate annulus and an outer annulus, each of said tube units having a first end and a further end,
  (b) first and second groups of first, second and third straight headers attached, respectively, to said first and further ends of each of said first tube units, said first header of each group being in fluid communication with said inner channels, said second header of each group being in fluid communication with said intermediate annuli and said third header of each group being in fluid communication with said outer annuli,
  (c) a first inlet attached to and in fluid communication with said first and third headers of said first group, said first inlet adapted to receive a flow of said compressed air for said pneumatic system,
  (d) a second inlet attached to and in fluid communication with said second header of said first group,
  (e) a first outlet attached to and in communication with said first and third headers of said second group, and
  (f) a second outlet attached to and in communication with said second header of said second group, said second outlet adapted to deliver demoisturized air to said pneumatic system;

a second heat exchanger portion substantially arranged in a second plane substantially parallel to said first plane, said second heat exchanger portion having,
  (a) a second plurality of substantially parallel straight tube units, each of said tube units formed of three concentric tubes defining an inner channel, an intermediate annulus and an outer annulus, each of said tube units having a first end and a further end,
  (b) third and fourth groups of first, second and third straight headers attached, respectively, to said first and further ends of each of said second tube units, said first header of each group being in fluid communication with said inner channels, said second header of each group being in fluid communication with said intermediate annuli, said third header of each group being in fluid communication with said outer annuli,
  (c) a third inlet attached to and in fluid communication with said first and third headers of said third group,
  (d) a fourth inlet attached to and in fluid communication with said first outlet of said first heat exchanger portion and said second header of said fourth group adapted to receive a flow of air from said first heat exchanger portion,
  (e) a third outlet attached to an in fluid communication with said second header of said third group, and
  (f) a fourth outlet attached to and in fluid communication with said first and third headers of said fourth group;

a centrifugal moisture separator connected to, and in communication with, said third outlet of said second heat exchanger portion and said second inlet of said first heat exchanger portion to remove entrained moisture from air passing through said second portion and return demoisturized air to said first heat exchanger portion; and means for introducing a flow of refrigerant into said third inlet of said second heat exchanger portion, and for removing said refrigerant from said fourth outlet of said second heat exchanger portion.

2. The heat exchanger system of claim 1 wherein air flow in said inner channel, and said outer and intermediate annuli of each said first tube units is co-current, and flow of said refrigerant is countercurrent to air flow in said second tube units.

3. The heat exchanger system of claim 1 wherein said tube units and said headers of said first portion are substantially identical with said tube units and said headers of said second portion, said first and second tube units being cylindrical and said headers of said first and second portions being cylindrical.

4. A heat exchanger system for removing moisture from compressed air that is to be used in a pneumatic system, which comprises:

a first heat exchanger portion having
  (a) a first plurality of substantially parallel tube units, each tube unit formed of three concentric tubes defining an inner channel, an intermediate annulus and an outer annulus, each of said tube units having a first end and a further end, (b) first and second groups of first, second and third headers attached, respectively, to said first and further ends of each of said first tube units, said first header of each group being in fluid communication with said inner channels, said second header of each group being in fluid communication with said intermediate annuli and said third header of each group being in fliud communication with said outer annuli, (c) a first inlet attached to and in fluid communication with said first and third headers of said first group, said first inlet adapted to receive a flow of said compressed air for said pneumatic system, (d) a second inlet attached to and in fliud communication with said second header of said first group, (e) a first outlet attached to and in communication with said first and third headers of said second group, and (f) a second outlet attached to and in communication with said second header of said second group, said second outlet adapted to deliver demoisturized air to said pneumatic system;

a second heat exchanger portion having, (a) a second plurality of substantially parallel tube units, each of said tube units formed of three concentric tubes defining an inner channel, an intermediate annulus and an outer annulus, each of said tube units having a first end and a further end, (b) third and fourth groups of first, second and third headers attached, respectively, to said first and further ends of each of said second tube units, said first header of each group being in fluid communication with said inner channels, said second header of each group being in fluid communication with said intermediate annuli, said third header of said group being in fliud communication with said outer annuli, (c) a third inlet attached to an in fluid communication with said first and third headers of said third group, (d) a fourth inlet attached to an in fluid communication with said first outlet of said first heat exchanger portion and said second header of said fourth group adapted to receive a flow of air from said first heat exchanger portion, (e) a third outlet attached to and in fluid communication with said second header of said third group, and (f) a fourth outlet attached to and in fluid communication with said first and third headers of said fourth group;

a moisture separator connected to, and in fluid communication with, said third outlet of said second heat exchanger portion, and said second inlet of said first heat exchanger portion;

means for introducing a flow of refrigerant into said third inlet of said second heat exchanger portion, and for removing said refrigerant from said fourth outlet of said second heat exchanger portion; and wherein air flow in all tubes of said tube units of said first heat exchanger portion is co-current, and air flow in all tubes of said tube units of said second portion is countercurrent to flow of said refrigerant.

5. The heat exchanger system of claim 4 wherein said tube units of said first portion are arranged in a first plane, said tube units of said second portion are arranged in a second plane substantially parallel to said first plane, said headers of said first portion are substantially parallel and are substantially perpendicular to said first tube units in said first plane, and said headers of said second portion are substantially parallel and are substantially peripendicular to said second tube units in said second plane.

6. The heat exchanger system of claim 5 wherein each of said tube units of said first section are substantially identical, and said tube units of said second section are substantially identical to said tube units of said first section.

7. The heat exchanger system of claim 4 wherein each of said tube units of said first and second portions is cylindrical, and each of said header units of said first and second portions is cylindrical.

* * * * *